United States Patent [19]

Angus

[11] Patent Number: 4,826,645

[45] Date of Patent: * May 2, 1989

[54] METHOD OF MAKING AN INTEGRAL BLADED MEMBER

[75] Inventor: James P. Angus, Penrith, England

[73] Assignee: Rolls-Royce Limited, London, England

[ * ] Notice: The portion of the term of this patent subsequent to Nov. 22, 2005 has been disclaimed.

[21] Appl. No.: 741,583

[22] Filed: Jun. 5, 1985

[30] Foreign Application Priority Data

Jul. 7, 1984 [GB] United Kingdom ............... 8417418

[51] Int. Cl.$^4$ ............................................. B29C 43/13
[52] U.S. Cl. .................................... 264/108; 264/255; 264/257; 264/277; 264/278; 264/279.1; 264/317; 264/328.8; 164/97
[58] Field of Search ............... 416/189 R, 244 A, 195, 416/230 R; 264/108, 328.8, 328.18, 255, 258, 174, 273, 275, 277, 278, 317, 257; 164/97, 98, 108, 109, 110

[56] References Cited

U.S. PATENT DOCUMENTS

| 2,857,094 | 10/1958 | Erwin | 415/214 X |
|---|---|---|---|
| 3,279,967 | 10/1966 | Martin | 416/230 R |
| 3,403,844 | 10/1968 | Stoffer | 416/214 |
| 3,456,917 | 7/1969 | Palfreyman et al. | 416/196 |
| 3,501,090 | 3/1970 | Stoffer et al. | 416/189 R |
| 3,532,438 | 10/1970 | Palfreyman et al. | 416/213 |
| 3,549,444 | 12/1970 | Katz | 415/214 X |
| 3,556,675 | 1/1971 | Howald | 416/230 |
| 3,616,508 | 11/1971 | Wallett | 416/230 |
| 3,632,460 | 1/1972 | Palfreyman et al. | 156/175 |
| 3,754,839 | 9/1973 | Bodman | 416/230 |
| 3,846,045 | 11/1974 | Mincuzzi | 416/230 |
| 3,880,978 | 4/1975 | Apostoleris | 264/328.12 |
| 3,901,961 | 8/1975 | Gorter | 264/108 |
| 3,932,062 | 1/1976 | Sisk | 416/230 |
| 4,098,559 | 7/1978 | Price | 418/230 |
| 4,203,732 | 5/1980 | Phaal | 264/108 |
| 4,248,817 | 2/1981 | Frank | 264/328.2 |
| 4,268,003 | 5/1981 | Liautaud | 264/328.8 X |
| 4,271,112 | 6/1981 | Rossman et al. | 264/108 X |
| 4,312,917 | 1/1982 | Hawley | 264/255 X |
| 4,339,229 | 7/1982 | Rossman | 416/218 |
| 4,354,804 | 10/1982 | Cruzen | 416/241 |
| 4,414,171 | 11/1983 | Duffy | 264/328.1 |
| 4,439,387 | 3/1984 | Hawley | 264/108 |
| 4,446,085 | 5/1984 | Farsley | 264/108 |
| 4,460,531 | 7/1984 | Harris et al. | 264/258 X |
| 4,464,097 | 8/1984 | Schultz | 416/230 |
| 4,493,808 | 1/1985 | Sedlatschek et al. | 264/108 |
| 4,564,491 | 1/1986 | Koestecki | 264/108 |
| 4,576,770 | 3/1986 | Schultz | 264/258 X |
| 4,654,181 | 3/1987 | Brandenstein | 264/328.1 |
| 4,671,739 | 6/1987 | Read | 416/230 |

FOREIGN PATENT DOCUMENTS

| 2304043 | 8/1974 | Fed. Rep. of Germany | 416/189 R |
|---|---|---|---|
| 1040697 | 10/1953 | France | 416/218 |
| 0077908 | 6/1977 | Japan | 416/230 R |
| 1403749 | 8/1975 | United Kingdom | 416/60 |

Primary Examiner—James Lowe
Assistant Examiner—Jeremiah F. Durkin, II
Attorney, Agent, or Firm—Cushman, Darby & Cushman

[57] ABSTRACT

A method of manufacturing a bladed disc from a fiber reinforced composite material which comprises injecting a mixture of short fibers and a matrix material into a dividable die so configured as to define the form of a disc having integral radially extending aerofoil blades. The mixture is injected into the die at such a location that the short fibers within the aerofoil-defining portions of the die are radially aligned. The die contains two support rings which are coaxially disposed within the bladed disc after injection molding so as to provide radial support for the aerofoil blades of the thus formed bladed disc. The method may be modified to provide the bladed disc with an integral shroud.

10 Claims, 3 Drawing Sheets

METHOD OF MAKING AN INTEGRAL BLADED MEMBER

BACKGROUND OF THE INVENTION

This invention relates to an integral bladed member and to a method of manufacturing such an integral bladed member.

It is known to manufacture discs with integral aerofoil blades, for instance those which are suitable for use in an axial flow compressor of a gas turbine engine, by injecting an appropriate resin matrix material into a die containing reinforcing fibers which have been aligned in a predetermined manner. There are problems with such a method of manufacture, however, in ensuring that the fibres remain in the desired configuration during the injection operation. Moreover it is difficult to ensure that all of the fibres are so disposed as to provide a bladed disc with optimum strength characteristics. A further disadvantage of the method is that it can be expensive in view of the fact that the reinforcing fibres usually have to be laid-up by hand.

SUMMARY OF THE INVENTION

It is an object of the present invention to provide a method of manufacturing an integral bladed member from a composite material which is cheap and results in an integral bladed member having good strength characteristics.

Discs with integral aerofoil blades also suffer from problems associated with the centrifugal loads which are imposed upon the aerofoil blades during disc rotation. Thus it is difficult to ensure that the fibre reinforcement of the bladed disc is such that the aerofoil blades are provided with adequate support against centrifugal loading.

It is accordingly a further object of the present invention to provide an integral bladed member in which the aerofoil blades are provided with adequate support to resist the centrifugal loadings imposed upon them in the event of rotation of the member.

According to the present invention, a method of manufacturing a bladed member comprising a disc having a plurality of integral radially extending aerofoil blades on the periphery thereof and a central aperture from a fibre reinforced composite material comprises injecting a mixture of short fibres and a matrix material into a dividable die so configured as to define the form of a disc having a central aperture and integral radially extending aerofoil blades on the periphery thereof, said mixture being injected into said die at such a location that said short fibres in said mixture which enter those portions of said die defining the aerofoil blades of said bladed member, generally radially align during said injection molding step, said die containing at least one support ring member prior to said injection molding step which is so positioned in said die as to be coaxially disposed within the bladed disc molded by said injection molding step and located adjacent the radially inner portions of the thus molded integral aerofoil blades to provide support therefor, and subsequently opening said die to release the thus molded bladed disc.

According to a further aspect of the present invention, an annular bladed member comprising a disc having a plurality of integral radially extending aerofoil blades on the periphery thereof and a central aperture is formed from a matrix material having short reinforcing fibres dispersed therein, said short reinforcing fibres being generally radially aligned, at least within said aerofoil blades, said member having at least one support ring so coaxially disposed within it as to be adjacent the radially inner portions of said aerofoil blades to provide support therefor.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
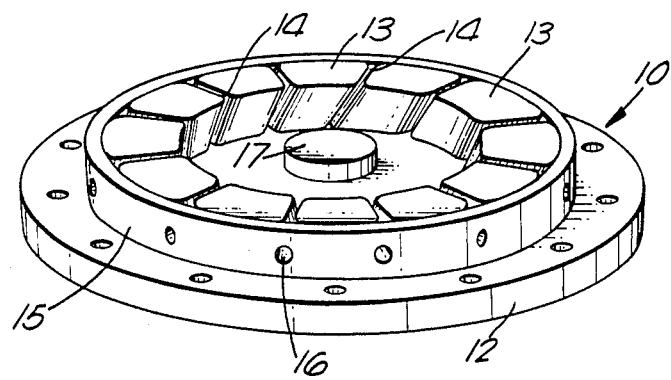
FIG. 1 is a view of a part of a dividable die for use in the method of the present invention.

With reference to FIG. 1 of the drawings, a portion 10 of dividable die 11 (shown in full in FIG. 3) comprises a disc shaped portion 12 upon which an annular array of inserts 13 is located. The inserts 13 are circumferentially spaced apart and so configured that the adjacent surfaces 14 thereof cooperate to define the flanks of an annular array of radially extending, circumferentially spaced apart aerofoil blades. A band 15 extends around the radially outer extents of the inserts 13. A plurality of apertures 16 is provided in the band 15; each aperture 16 being aligned with each space between the inserts 13. The disc-shaped portion 12 is additionally provided with a cylindrical insert 17 at the centre thereof for the purpose of defining a central hole in the bladed disc which is to be produced.

Figure 2:
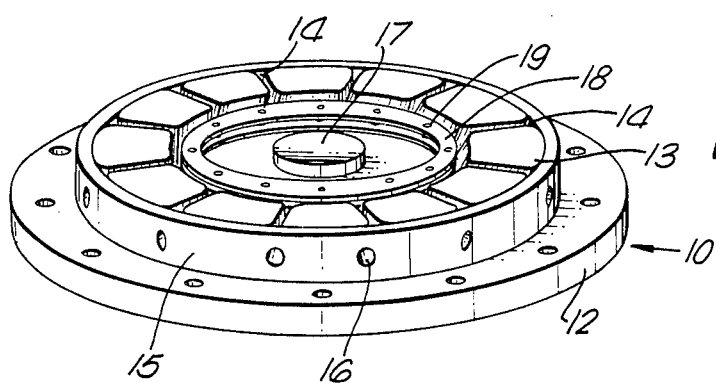
FIG. 2 is a view of the die part shown in FIG. 1 containing two support rings.

Two filament wound support rings 18 are placed in the die portion 10 as shown in FIG. 2. The support rings 18 are positioned so as to be coaxial with the cylindrical insert 17 and are maintained in an axially spaced apart relationship with each other and the die portion 10 by a plurality of pins 19 which are located in appropriate apertures provided within the rings 18. The support rings 18 are formed from epoxy resin coated carbon filaments which have been wound around an appropriately shaped mandrel, removed from the mandrel and then cured.

Figure 3:
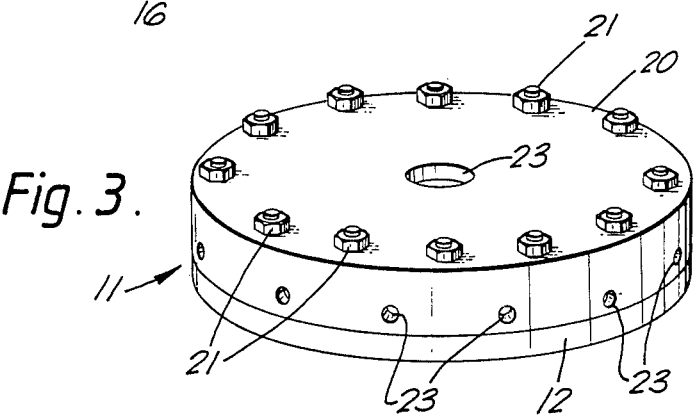
FIG. 3 is a view of the complete die for use in the method of the present invention.

The die 11 is then closed by placing the remaining die portion 20 on the first die portion 10 whereupon the two are fastened to each other by a plurality of nuts and bolts 21 as can be seen in FIG. 3. Thus the interior of the die 11 defines the configuration of disc having a plurality of integral radially extending aerofoil blades.

Figure 4:
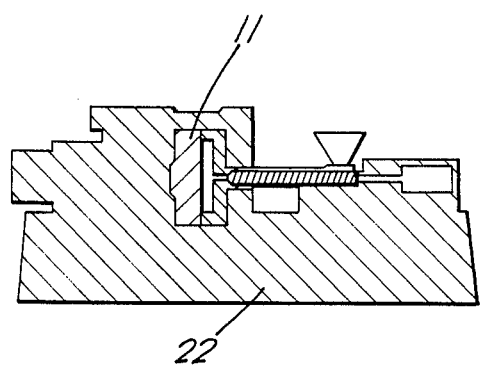
FIG. 4 is a sectioned side view of an injection molding apparatus injecting the die shown in FIG. 3.

The complete die 11 is then placed in an injection molding machine 22 as shown in FIG. 4 and a mixture of short, chopped carbon fibres and a polyetheretherketone resin is injected into the interior of the die 11 through a central port 23 provided in the second die portion 20. A plurality of apertures 23 are provided in the peripheral surface of the second die portion 20 which align with the apertures 16 in the band 15 so as to facilitate the escape of air from within the die 11 during the injection molding operation.

Figure 5:
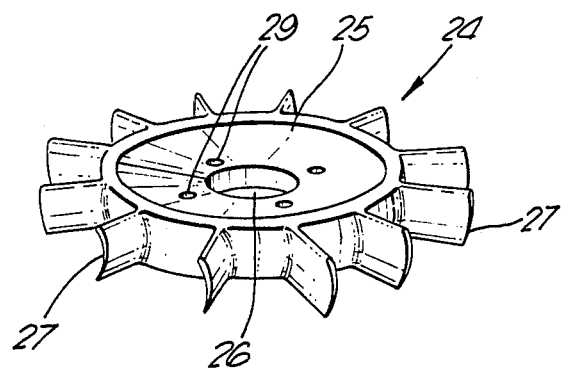
FIG. 5 is a view of a bladed disc in accordance with the present invention.

When the injection moulding operation has completed, the filled die 11 is removed from the injection molding machine 22 and divided to provide access to the thus produced bladed disc 24 as shown in FIG. 5.

As can be seen from FIG. 5, the bladed disc 24 comprises a central disc 25 having a circular hole 26 at its centre which has been defined by the die insert 17. A plurality of circumferentially spaced apart aerofoil blades 27 which are integral with the disc 25 extend radially from it. The internal structure of the bladed disc 24 can be seen more clearly in FIG. 6. It will be seen from FIG. 6 that the short chopped carbon fibres 28 within the aerofoil blades 27 are dispersed within the polyetheretherketone resin matrix material and are generally radially aligned as a result of the constriction to flow of the injected chopped carbon fibre/resin mixture provided by the inserts 13. This alignment is the optimum for the transference of centrifugal loads upon the aerofoil blades 27 to the two support rings 18 which are enclosed within the disc 25 and located adjacent the radially inner portions of the aerofoil blades 27. It will be seen therefore that the support rings 18 carry the majority of the centrifugal loads imposed upon the aerofoil blades 27 during the rotation of the disc 25, thereby considerably enhancing the structural integrity of the bladed rotor 24. It will be appreciated that although the presently described example is provided with two support rings 18, it may be desirable in certain circumstances to provide only one support ring or alternatively more than two rings. Moreover although the described support rings 18 are formed from filament wound carbon which has been coated with an epoxy resin, alternative materials could be used in their construction if so desired. Thus filaments of silicon carbide, steel or alumina could be enclosed in a matrix of a polyimide resin, aluminum or alloys thereof or magnesium or alloys thereof, or titanium or alloys thereof.

It will also be appreciated that mixture used to injection mold the blade disc 24 need not necessarily be restricted to chopped carbon fibres in a polyetheretherketone resin matrix. Thus chopped fibres of silicon carbide or alumina could be enclosed in a matrix of an epoxy resin, a polyimide resin, aluminium or alloys thereof or magnesium or alloys thereof, or titanium or alloys thereof.

Figure 6:
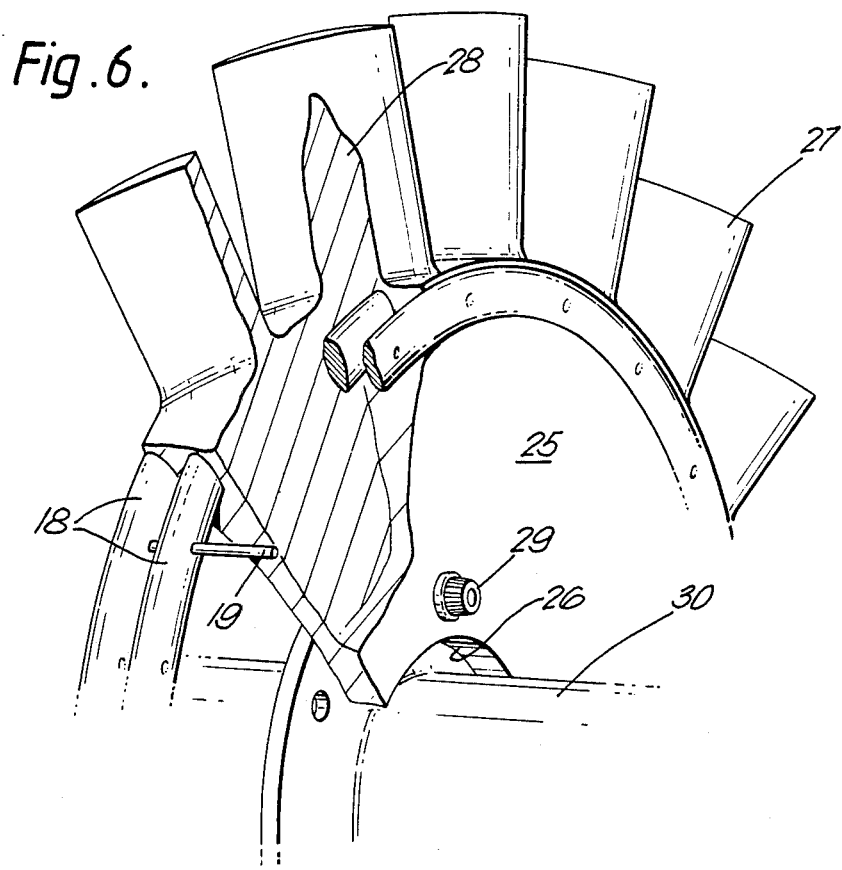
FIG. 6 is a partially sectioned view of a portion of the bladed disc shown in FIG. 5.

The disc 25 of the bladed rotor 24 is additionally provided with four holes 29 equally spaced apart around its central circular hole 26 to facilitate its attachment by bolts to a flanged shaft 30 of a gas turbine engine as can be seen in FIG. 6.

It is envisaged that the method of the present invention could be used in the manufacture of bladed rotors 24 which are so configured with re-entrant features that they could not be easily removed from the die 11 after molding. In such circumstances, mould inserts 13 could be used which are made from a low melting point alloy. The alloy would then be melted out prior to the removal of the bladed disc 24 from the die 11. If the bladed disc 24 is formed from reinforcing fibres enclosed in a metal matrix, a suitable alternative material could be used to manufacture the insert 13 such as a water dispersible ceramic containing material.

It may be found with certain bladed disc 24 configurations that the presence of the support rings 18 in the path of the injection molded chopped fibre/resin mixture which eventually enters the die portions defining the aerofoil blades 27 may be detrimental to blade strength. Thus the support rings 18 will divide the chopped fibre/resin mixture flow prior to the mixture entering the blade cavities in the die 11 which flow will recombine within the blades cavity thereby creating what is in effect a weld plane in the mixture within the blade cavity. This may be avoided if so desired by injecting the chopped fibre/resin mixture through the apertures 23 and 16 into the die 11 interior instead of through the central part 23.

Figure 7:
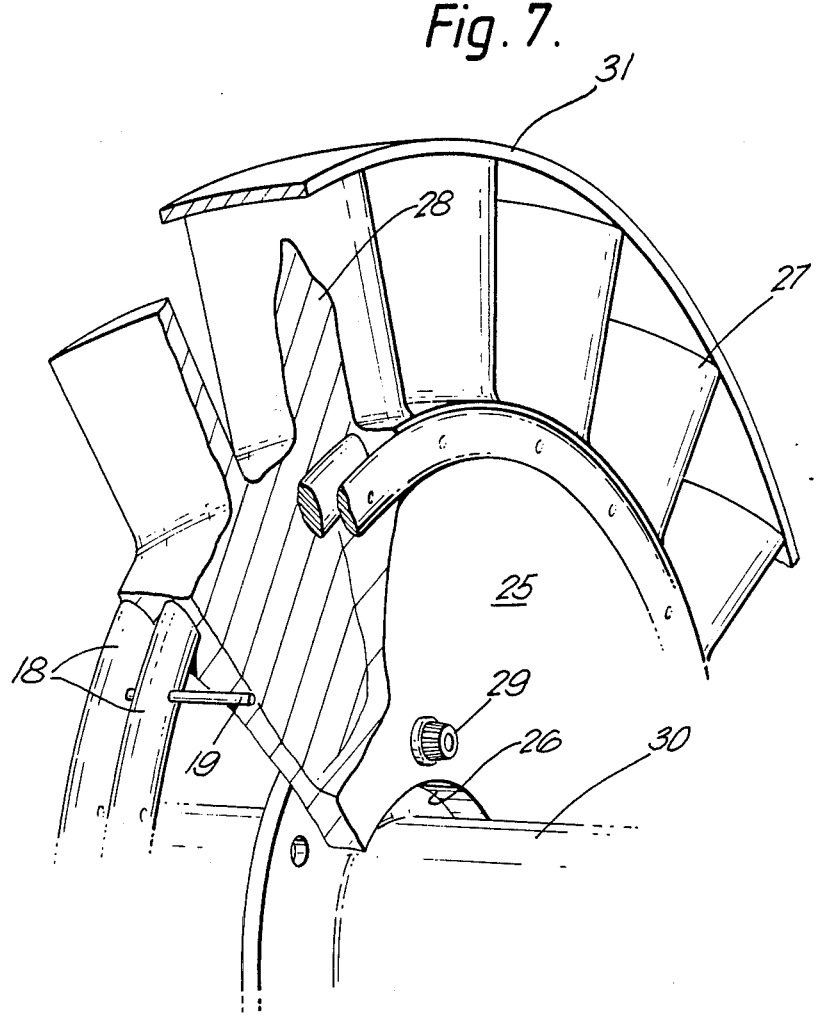
FIG. 7 is a partially sectional view of an alternative form of bladed disc in accordance with the present invention.

It may be desirable in circumstances to provide the bladed disc 24 with an integral shroud rings 31 as can be seen in FIG. 7. Such a shroud ring 31 would be useful for instance in providing further support for the aerofoil blades 27 against the centrifugal loads which are imposed upon them during rotation of the disc 25. Such a shroud ring 31 could be provided on the bladed disc 24 by the method described in our copending patent application Ser. No. 751,584 entitled "Method of Manufacturing an Annular Bladed Member Having an Integral Shroud". Thus in providing the bladed disc 24 with an integral shroud 31, the band 15 around the inserts 13 could be replaced by wound dry fibres which would be partially impregnated by the injected chopped fibre/resin matrix material mixture. Completion of impregnation would be achieved by injection of a resin matrix material into the wound fibres through the apertures 23 in the die portion 20.

The fibres in the shroud 31 could be of carbon, silicon carbide, steel or alumina and the matrix material injected into the wound fibre could be an epoxy resin, a polyetheretherketone reesin, a polyimide resin, aluminum or an alloy thereof or magnesium or an alloy thereof, or titanium or alloy thereof.

It will be seen therefore that the method of the present invention provides a cheap, simple method of manufacturing strong bladed rotors 24 which is particularly well suited to the mass production of such components. This being so, the method of the present invention finds particular utility in the manufacture of small, low cost gas turbine engines, such as those intended to power expendable vehicles.

Although the present invention has been described with reference to a bladed rotor and a method of manufacturing such a bladed rotor, it will be appreciated that it is not restricted to rotor members and could be applied to stator members. In the case of a stator annular bladed member, the disc supporting the aerofoil blades would have a larger diameter aperture in the centre thereof so that the apertured disc is effectively a ring member providing support for the radially inner portions of the aerofoil blades.

I claim:

1. A method of manufacturing an annular bladed member comprising a disc having a plurality of integral radially extending aerofoil blades on the periphery thereof and a central aperture from a fiber reinforced composite material comprising the steps of providing a dividable die having a first part and a second part which when joined together define a die cavity, placing at least one support ring in one of said dividable die members and then closing said die members, injecting a mixture of short fibers and a matrix material into said dividable die cavity which so configured as to define the form of a disc having a central aperture and integral, radially extending aerofoil blades on the periphery thereof, said mixture being injected into said die cavity as such a location that said short fibers in said mixture which enter those portions of said die cavity defining the aerofoil blades of said bladed member, generally radially align themselves during said injection molding step, said at least one support ring being so positioned in said die as to be coaxially disposed within the disc molded by said injection molding step and located adjacent the radially inner portions of the thus molded integral aerofoil blades to provide support therefor, and subsequently opening said die to release the thus molded bladed member.

2. A method of manufacturing an integral bladed member as claimed in claim 1 wherein said die additionally contains a wound ring of dry fibre which is coaxially disposed within said die and which is positioned so as to interconnect the radially outer extents of said die portions defining the aerofoil blades of said bladed member whereby said ring of dry fibre is partially impregnated by said short fibre/matrix material mixture during said injection molding step, said remaining wound fibre which has not been so impregnated being subsequently impregnated in a subsequent matrix material injection step.

3. A method of manufacturing an integral bladed member as claimed in claim 2 wherein said dry wound fibre is selected from the group consisting of carbon, steel, silicon carbide and alumina.

4. A method of manufacturing an integral bladed member as claimed in claim 2 wherein said matrix material in said subsequent injection step is selected from the group consisting of an epoxy resin, a polyetheretherketone, a polyimide resin, aluminum or an alloy thereof, magnesium or an alloy thereof, and titanium or an alloy thereof.

5. A method of manufacturing an integral bladed member as claimed in claim 1 wherein said at least one support ring is formed from a filament wound material.

6. A method of manufacturing an integral bladed member as claimed in claim 5 wherein said filaments are selected from the group consisting of silicon carbide, steel, alumina and carbon.

7. A method of manufacturing an integral bladed member as claimed in claim 5 wherein said filament wound material has a matrix selected from the group consisting of an epoxy resin, a polyetheretherketone resin, a polyimide resin, aluminium or an alloy thereof, magnesium or an alloy thereof, and titanium or an alloy thereof.

8. A method of manufacturing an integral bladed member as claimed in claim 1 wherein said matrix material mixed with said short fibres is selected from the group consisting of an epoxy resin, a polyetheretherketone resin, polyimide resin, aluminum or an alloy thereof, magnesium or an alloy thereof, and titanium or an alloy thereof.

9. A method of manufacturing an integral bladed member as claimed in claim 1 wherein said short fibres mixed with said matrix material are selected from the group consisting of carbon, silicon carbide and alumina.

10. A method of manufacturing an integral bladed member as claimed in claim 1 wherein said dividable die contains mould inserts and said inserts are formed from a low melting point alloy, said alloy being melted prior to the removal of said thus produced bladed disc from said die.

* * * * *